June 16, 1925.
H. M. REYNOLDS
1,541,849
MEANS FOR HEATING AND CIRCULATING LIQUID IN A HEATING TANK
Filed Dec. 4, 1922    2 Sheets-Sheet 2
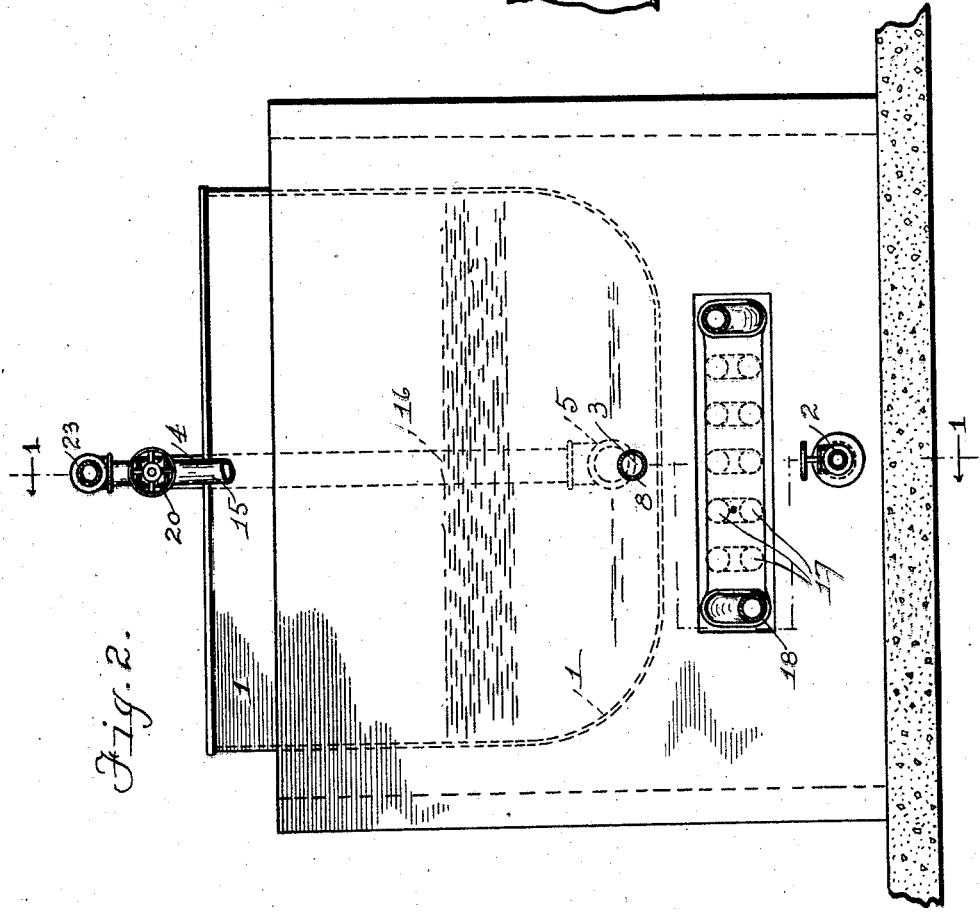
Inventor:
Harry M. Reynolds
by Cyrus W. Rice
Attorney.

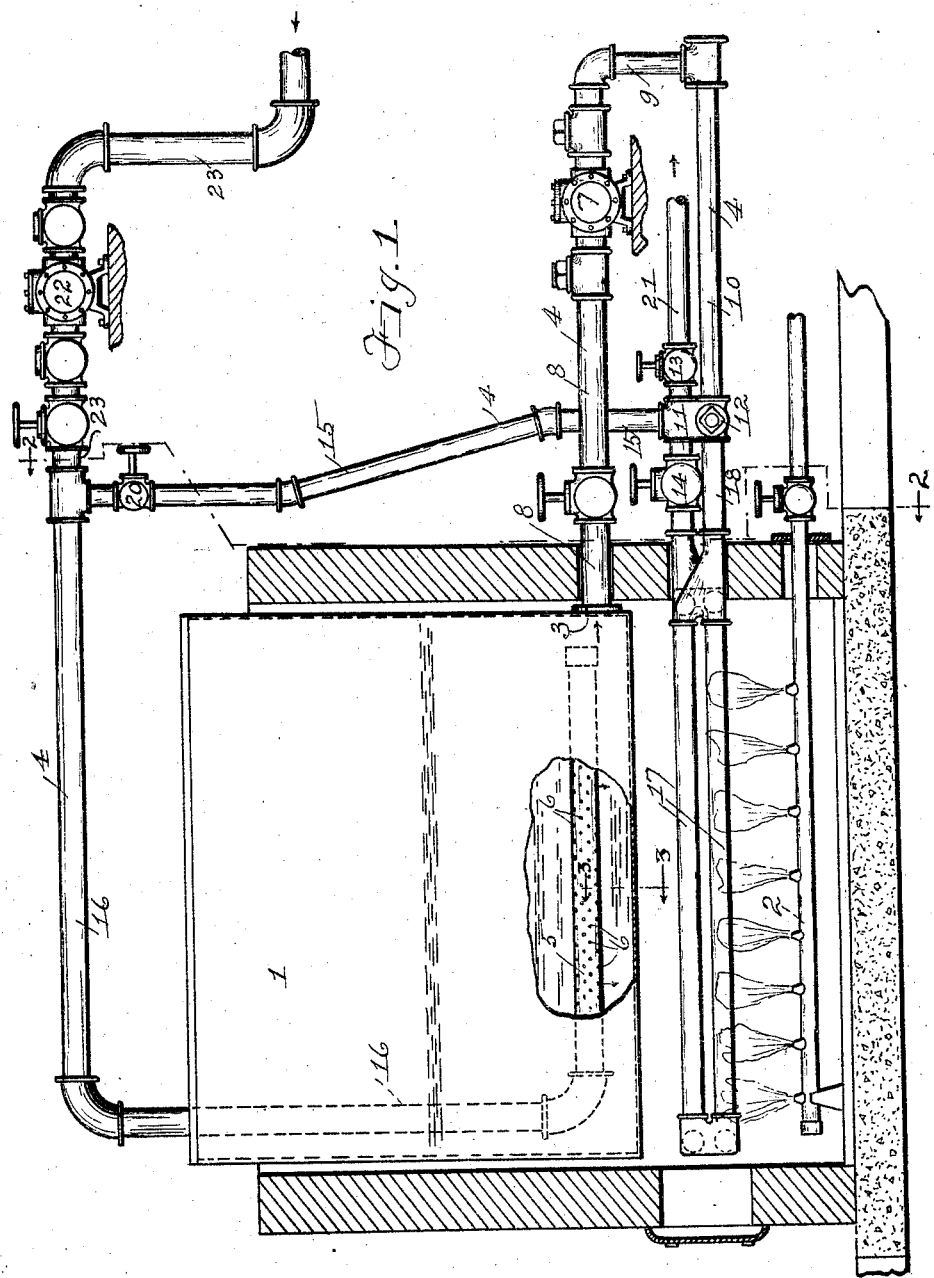

Patented June 16, 1925.

1,541,849

UNITED STATES PATENT OFFICE.

HARRY M. REYNOLDS, OF GRAND RAPIDS, MICHIGAN, ASSIGNOR TO H. M. REYNOLDS SHINGLE COMPANY, OF GRAND RAPIDS, MICHIGAN, A CORPORATION OF MICHIGAN.

MEANS FOR HEATING AND CIRCULATING LIQUID IN A HEATING TANK.

Application filed December 4, 1922. Serial No. 604,954.

*To all whom it may concern:*

Be it known that I, HARRY M. REYNOLDS, a citizen of the United States, residing at Grand Rapids, in the county of Kent and State of Michigan, have invented new and useful Improvements in Means for Heating and Circulating Liquid in a Heating Tank, of which the following is a specification.

The present invention relates to means for heating and circulating liquid in a heating tank; and its object is, generally, to provide improved means of that character; and more particularly, to provide such means whereby such a liquid as melted asphalt may be prevented from solidifying and adhering to the tank.

This object is attained by, and the invention finds preferable embodiment in, the structure hereinafter particularly described in the body of this specification and illustrated by the accompanying drawings, in which:—

Figure 1 is a side view of apparatus for heating and circulating liquid, its surrounding wall or casing being sectioned on line 1—1 of Figure 2 and a portion of the tank being broken away to show its interior;

Figure 2 is an end view of the same, certain pipes being sectioned on line 2—2 of Figure 1; and Figure 3 is a fragmentary view of a portion thereof shown in section on line 3—3 of Figure 1.

In melting and heating such materials as asphalt for the purpose of applying the same to felt and the like for roof coverings and similar uses, great difficulty arises from the tendency of such thick and sluggishly flowing materials to adhere to the inner surface of the kettle or tank in which they are being melted and heated, thus forming a more or less solid cake or crust of the material on the tank's interior. By the forming of such a cake some of the material is, of course, wasted; the cake by its addition to the thickness of the tank's wall shuts off from the liquid material therein some of the heat; and time and labor must be expended in removing the cake from the tank.

The object of my present invention is to obviate these difficulties. To this end, I provide a kettle or tank 1 adapted to contain a material—such as asphalt—for heating and melting or reducing the same to liquid form. Means for heating the tank are provided, which means may be of any suitable and well-known form, as the oil heater 2 located beneath the tank. The tank has, adjacent its bottom and below the level of the liquid material therein, a vent 3. A pipe designated generally 4 and comprising continuous portions as hereinafter pointed out, has a terminal closed-end portion 5 inside the tank and below the level of the liquid material therein. This portion 5 has a plurality of perforations 6 through its wall. The liquid may be pumped by a suitable pump indicated at 7 through the vent 3 and continuous portions 8, 9, 10 of the pipe 4, then through the pipe-union 11 (the two-way valve 12 being turned to permit such movement of the liquid and the valves 13, 14 being closed) and thence through the portions 15, 16 of pipe 4 and to its exit through the perforations 6 of the pipe's portion 5. It will be seen that the liquid in passing out through these perforations agitates or stirs the liquid in the tank, particularly that part of the same which is near its bottom, and thus prevents its stagnating sufficiently to form a cake or crust on the tank's inner surface.

I also provide an extension of the pipe 4 beneath the tank and above the heating means, comprising return coils or pipes 17. When the two-way valve 12 is turned to permit it, the liquid is pumped through the continuous portion 18 of the pipe 4 and into and through the pipes 17 instead of passing directly into the portion 15 of the pipe 4, the valve 14 being opened and the valve 13 closed. The liquid is thus forced through the portions 15, 16 of the pipe 4 and out of the perforations 6. In this manner the liquid is heated by the pipes or coils 17 in another portion of its circuit and additionally to the heating it receives while in the tank itself. Whether the liquid passes through these coils or pipes 17 or not, it is pumped in a circuit through the perforations 6 and into and out of the tank in either case.

By opening the valves 13, 14 and closing the valve 20 the liquid may, when sufficiently heated, be forced through the pipe 21 into a suitable vat (not shown) containing the felt or other substance to be saturated or coated with the liquid, whence it may be returned by a suitable pump indicated at 22, through the pipe 23, portions 16 and 5 of the pipe 4 and the perforations 6 into the tank for reheating. When the liquid is not to be passed through the pipes or coils 17, in being pumped into such vat, the valve 14 is closed.

The invention being intended to be pointed out in the claims, is not to be limited to or by details of construction of the particular embodiment thereof illustrated by the drawings or hereinbefore described or shown.

I claim:—

1. A tank adapted to contain a heated liquid, and having a vent below the level of the liquid; means for heating the tank and the liquid therein; a pipe extending into the tank and having a plurality of perforations opening into the liquid therein below its level; means for circulating the liquid through the pipe and its perforations into the tank and out through its vent.

2. A tank adapted to contain a heated liquid, and having a vent below the level of the liquid; a pipe extending from said vent, and beneath the tank, and into the tank and having a plurality of perforations opening into the liquid therein below its level; means for heating the tank and the liquid therein and the portion of the pipe which is beneath the tank; means for circulating the liquid through the pipe and its perforations into the tank and out through its vent.

In testimony whereof I have hereunto set my hand at Grand Rapids, Michigan, this 28th day of November, 1922.

HARRY M. REYNOLDS.